United States Patent
Munro

(10) Patent No.: US 9,365,994 B2
(45) Date of Patent: Jun. 14, 2016

(54) FILTER BOOM USING CARBON NANOTUBES

(71) Applicant: Kevin E. Munro, Auburn, WA (US)

(72) Inventor: Kevin E. Munro, Auburn, WA (US)

(*) Notice: Subject to any disclaimer, the term of this patent is extended or adjusted under 35 U.S.C. 154(b) by 0 days.

(21) Appl. No.: 14/669,891

(22) Filed: Mar. 26, 2015

(65) Prior Publication Data
US 2015/0275452 A1    Oct. 1, 2015

Related U.S. Application Data

(60) Provisional application No. 61/971,353, filed on Mar. 27, 2014.

(51) Int. Cl.
| | |
|---|---|
| E02B 15/10 | (2006.01) |
| E02B 15/04 | (2006.01) |
| C02F 1/28 | (2006.01) |
| C02F 1/68 | (2006.01) |
| C02F 101/32 | (2006.01) |
| C02F 103/00 | (2006.01) |
| C02F 103/08 | (2006.01) |

(52) U.S. Cl.
CPC .............. *E02B 15/041* (2013.01); *C02F 1/283* (2013.01); *C02F 1/681* (2013.01); *C02F 2101/32* (2013.01); *C02F 2103/007* (2013.01); *C02F 2103/08* (2013.01); *C02F 2305/08* (2013.01)

(58) Field of Classification Search
CPC ..................................................... E02B 15/045
USPC ..................................................... 405/60, 63
See application file for complete search history.

(56) References Cited

U.S. PATENT DOCUMENTS

| | | | | | |
|---|---|---|---|---|---|
| 5,360,654 | A | * | 11/1994 | Anderson | B01J 20/28014 156/62.4 |
| 5,389,166 | A | * | 2/1995 | White | B09B 1/00 112/420 |
| 6,637,135 | B2 | * | 10/2003 | Chesner | B01D 61/18 37/318 |

OTHER PUBLICATIONS

Polsen, et al., "Continuous Manufacturing of Aligned Carbon Nanotube Films," Academic Article, pp. 1-8, Department of Mechanical Engineering, University of Michigan, Ann Arbor, MI, US.
Pascal, et al., "Entropy and the driving force for the filling of carbon nanotubes with water," Journal, Jul. 19, 2011, pp. 11794-11798, vol. 108, No. 29, Proceedings of the National Academy of Sciences of the United States of America (PNAS), www.pnas.org/cgi/doi/10.1073/pnas.1108073108.
NanoLab Inc., "Aligned Carbon Nanotube Arrays and Forests on Substrates," Webpage, Nov. 1, 2011, pp. 1-3, NanoLab Inc., Waltham, MA, US, www.nano-lab.com/alignedcarbonnanotubearrays.html.

(Continued)

*Primary Examiner* — Tara M. Pinnock
(74) *Attorney, Agent, or Firm* — Kilpatrick Townsend & Stockton LLP

(57) ABSTRACT

A filter boom for removing surface and submerged oils and for filtering water is described. The filter boom may include multiple panels that may be connected to form a structure. Each of the panels may have a top interface attachable to a deployment mechanism, a bottom interface attachable to a load, a side interface attachable to another panel, and a body for filtering the water. The body may use carbon nanotubes sized to allow the water filtering and the oil retention.

20 Claims, 12 Drawing Sheets

(56) References Cited

OTHER PUBLICATIONS

Fesenmaier, "Caltech Researchers Find That Disorder Is Key to Nanotube Mystery," Online Article, Aug. 12, 2011, pp. 1-2, Caltech, Pasadena, CA, US, www.caltech.edu/news/caltech-researchers-find-disorder-key-nanotube-mystery-1711.

Winters, "Carbon Nanotube Super-Fabric," Online Article, Mar. 2011, pp. 1-4, The American Society of Mechanical Engineers (ASME), https://www.asme.org/engineering-topics/articles/nanotechnology/carbon-nanotube-super-fabric.

* cited by examiner

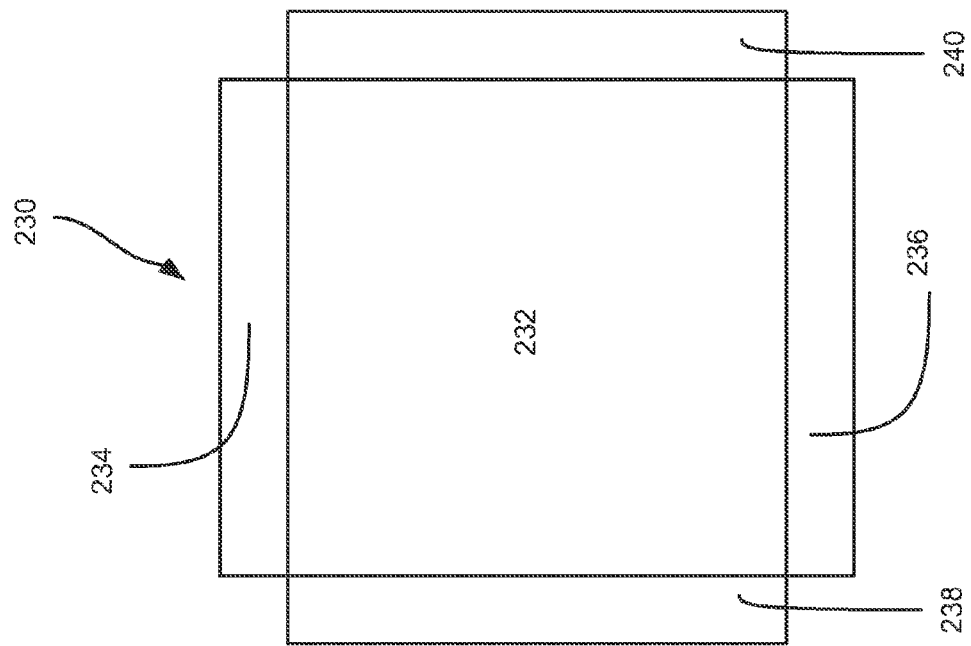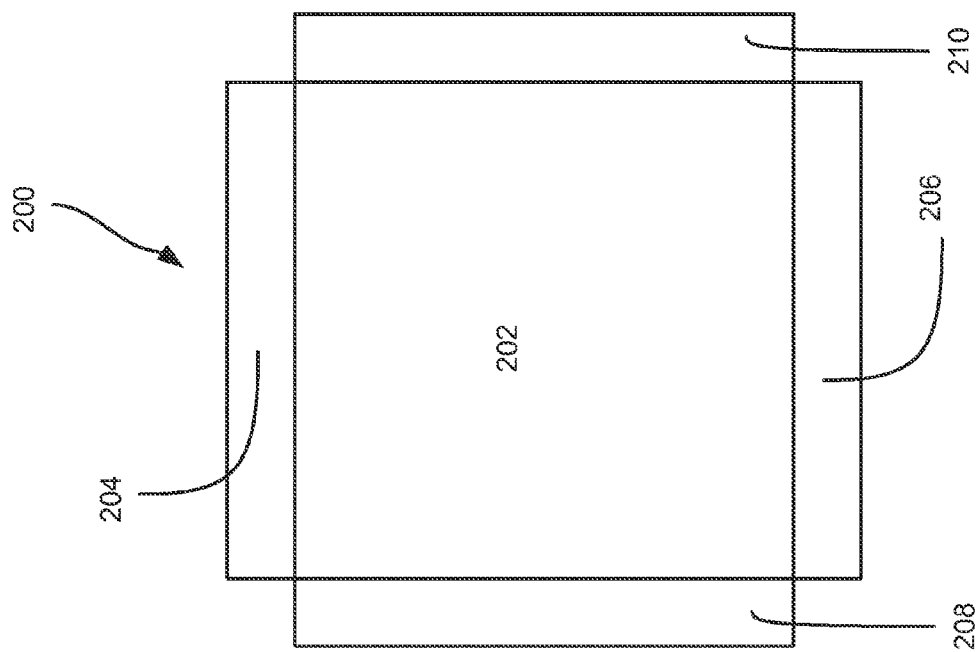

FILTER BOOM USING CARBON NANOTUBES

CROSS-REFERENCE TO RELATED APPLICATIONS

This application claims the benefit of Provisional Application Ser. No. 61/971,353, filed Mar. 27, 2014 and entitled "A FILTER BOOM USING CARBON NANOTUBES," which is incorporated herein by reference in its entirety.

BACKGROUND OF THE INVENTION

Filter booms are typically used to remove surface and submerged oils and oil-borne contaminants from a body of water and to reduce turbidity in the water. For example, in an oil spill, oil particles and oil-borne contaminants contaminate a body of water and cause ecological and health risks. Filter booms are deployed to contain the oil spill and filter the water. In many configurations, the oil booms are assembled to form a structure deployable in the body of water to surround the oil spill, blocking the oil from leaving the volume defined by structure, but allowing the water to pass through. However, the nature of the body of water (e.g., a spill in a river, a spill in an ocean, or other types of spills), the extent of the oil spill, and, sometimes, the turbulence in the water require large, heavy, and complicated filter boom structures. Such structures are not easy to transport and deploy.

BRIEF DESCRIPTION OF THE DRAWINGS

Various embodiments in accordance with the present disclosure will be described with reference to the drawings, in which:

FIG. 2 illustrates an example structure of a multi-panel filter boom, according to embodiments;

On the different figures, the same reference numbers designate like or similar elements.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, filter booms. As explained above, structures of deployed filter booms may be large, heavy, and complicated. In an embodiment, a filter boom includes a multi-panel structure, where the panels can be attached to each other to form different structures. Various interfaces are usable to attach the panels, including mechanical, magnetic, and electromagnetic interfaces. Further, each panel includes portions made of carbon nanotubes aligned and sized according to water flow and filtering requirements. As such, lighter, stronger, and more easily deployable filter boom structures may be produced and used.

Figure 1:
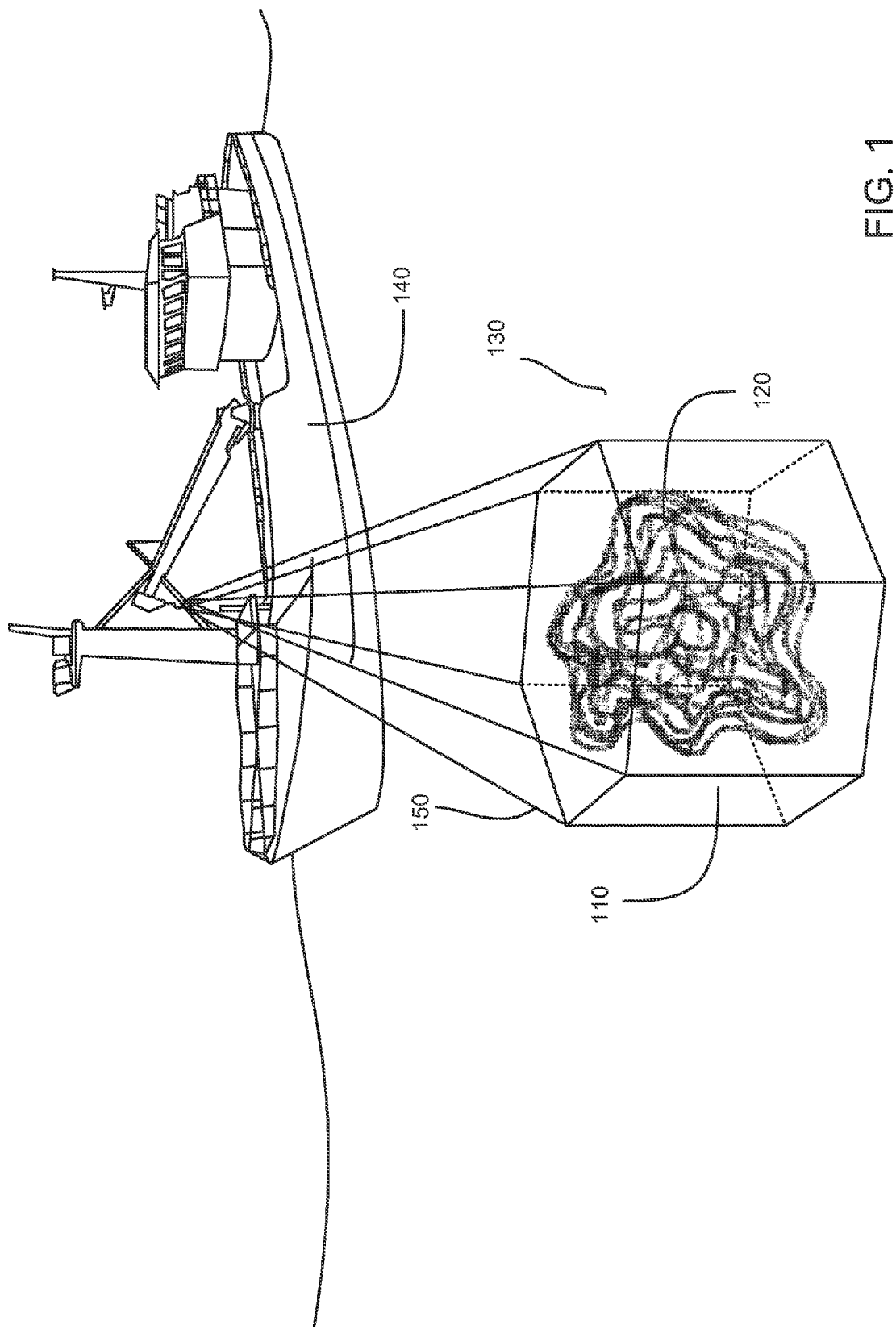
FIG. 1 illustrates an example filter boom deployed to contain an oil spill, according to embodiments.

Turning to FIG. 1, that figure illustrates an example filter boom 110 deployed to contain an oil spill 120 in a body of water 130. The oil spill 120 includes, among other things, oil particles and oil-borne contaminants that contaminate the body of water 130. The filter boom 110 can be deployed to filter the water and to contain the oil spill 120.

In a typical deployment, the filter boom 110 is deployed from a deployment body 140 (e.g., a boat) via a deployment mechanism 150 into the body of water 130 in the area of the oil spill 120. The deployment body 140 and/or the deployment mechanism 150 may depend on the structure of the filter boom 110. In turn the structure of the filter boom 110 may depend on the oil spill 120 and the body of water 130. For example, the nature of and the amount of turbulence in the body of water 130 and the type and extent of the oil spill 120 can dictate a set of requirements, such as volume, flow, filtering, and other requirements. In turn, the requirements can dictate a structure for the filter boom 110 and, accordingly, for the deployment body 140 and the deployment mechanism 150.

To support the variable requirements, the structure of the filter boom 110 includes multiple inter-attachable panels. Some or all of the panels include attachment points that can be coupled to the deployment mechanism 150. In addition, the size (length, height, and/or width) of the panels can vary. As such, based on the requirements, certain panels are chosen (e.g., ones that are sized properly to meet the requirements) and are assembled to create the filter boom 110. Further, the panels may be made of flexible material that may include portions configured for filtering water. The next figures illustrate examples of panels and attachment points.

As illustrated in FIG. 1, in an ocean spill, large panels can be used (e.g. ones that may need to run from the surface to the bottom of the ocean). The panels are inter-attached to form a closed structure. A deployment body 140, such as a boat, is used to deploy the filter boom 110, where the attachment points of panels are connected to a deployment mechanism of the boat via a number of cables. In comparison, in a river spill, smaller panels can be used. The panels can also be inter-attached but need not form a closed structure. Instead, the panels can run from one bank to the opposite bank of the river. Further, the attachment points of the panels can be connected via cables to a structure over the river (e.g., a bridge) and/or to structures on the banks (e.g., deployment trucks).

In addition, within a certain body of water 130 and a certain oil spill 120, the requirements may also vary. For example, contamination is not necessarily limited to the surface but also occurs at various depths of the body of water 130. Higher turbulence and heavier oil particles and oil-borne contaminants may be located at deeper levels of the body of water 130. As such, the requirements may vary across the depth. In other words, the performance of the filter boom 110 can be improved by accounting for this variability. To do so, the configuration of a panel of the filter boom 110 can change based on the depth. Upper portions of the panel (e.g., the portions closer to the water surface) may meet one set of requirement while lower portions of the panel (e.g., the portions located deeper in the body of water 130) may meet another set of requirements. For example, the upper portions may use smaller diameters of filtering tubes, while the lower portions may use larger diameters of filtering tubes. These and other features of the filter boom 110 are further described in the next figures.

Because of the various requirements, the structure of the filter boom 110 may become large and complex, which impacts the ability to deploy the filter boom 110. For example, the size and the number of the panels may increase with the extent of the oil spill 120. As such, heavier, larger, and an additional number of panels need to be transported, assembled and deployed to contain the oil spill 120 and then removed when done. To ease the challenges of that process, the filter boom 110 may provide a solution across two dimensions. One, the multiple inter-attachable panels can be used as building blocks of a large and complex structure. The panels use interfaces such that panel-to-panel attachments can be quick and easy, while also structurally sufficient. So can also be the panel-to-deployment mechanism interfaces. Two, some or all of the panels use carbon nanotubes for filtering. In comparison to a traditional filtering panel, a panel or portions of a panel made with carbon nanotubes is lighter and stronger. Further, the diameters of the carbon nanotubes can vary across the panel. As described herein above, smaller diameter carbon nanotubes can be used for the upper portions, while larger diameter carbon nanotubes can be used for the lower portions.

In the interest of clarity of explanation, FIG. 1 and various embodiments described in the next figures illustrate a filter boom 110 for containing oil and filtering water. However, the filter boom 110 may not be limited as such. Instead, the filter boom 110 can be configured to contain other types of spills (e.g., other particles) and to filter other liquids. Further, in some applications, the filter boom 110 need not have a large and complex structure. For example, deploying a filter boom of one panel, or some other small number of panels, may be sufficient.

Turning to FIG. 2, that figure illustrates an example of panels 200 and 230 that the filter boom 110 can include. The panels 200 and 230 have a similar configuration. The panel 200 includes a flexible body 202 configured for containing the oil spill and filtering the water. More particularly, the body has a first face and a second face. A filtering material is disposed between these two sides. As previously noted, the filtering material may include carbon nanotubes. When deployed, the body 202 is in contact with oil particles, oil-borne contaminants, and water on at least one of the sides (e.g., the first side). However, because of the filtering material, the body 202 retains the oil on the first side while allowing the water to pass from the first side to the second side, thereby filtering the water.

Figure 3:
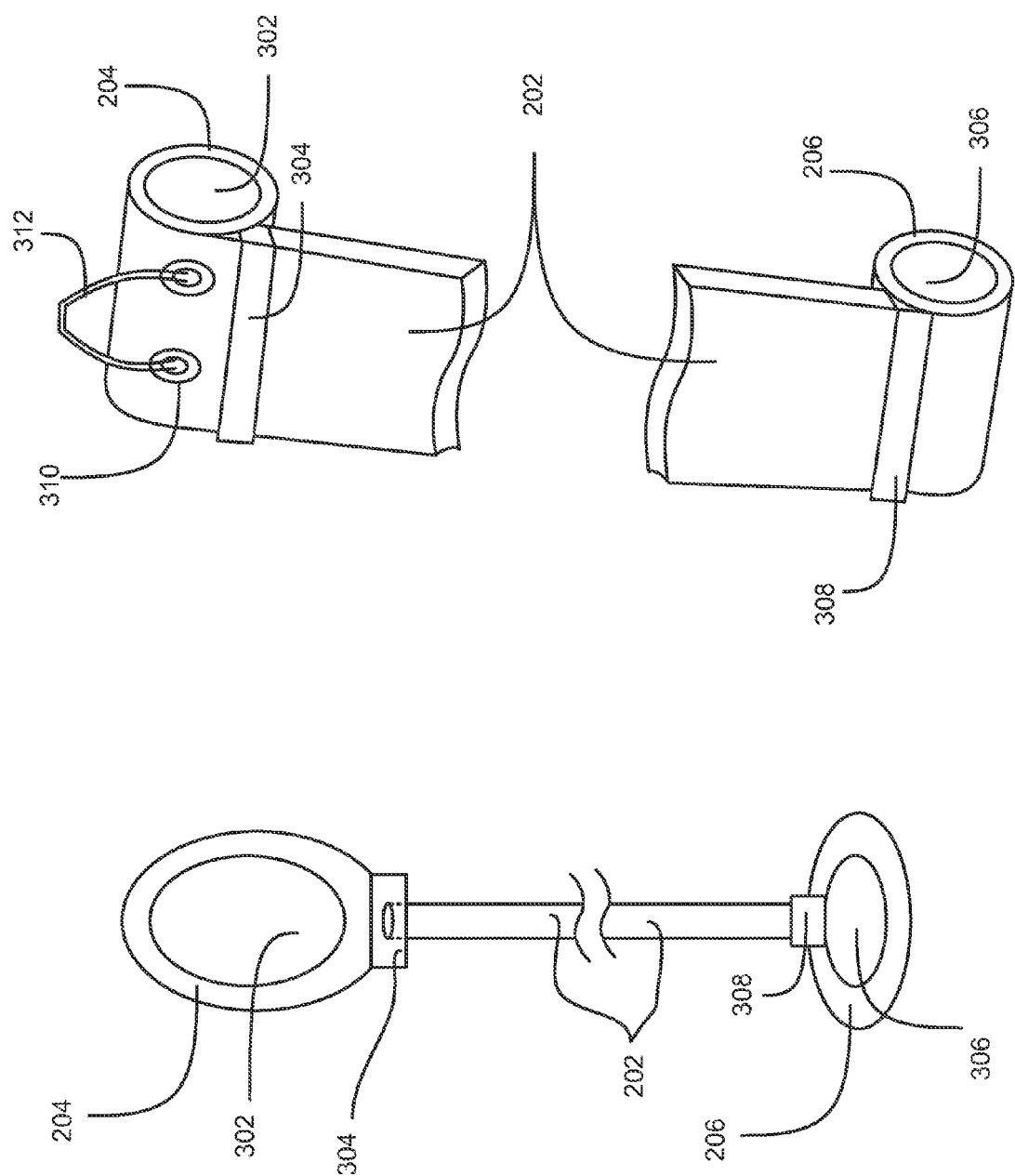
FIG. 3 illustrates a cross-section and a side view of an example panel, according to embodiments.
Figure 4:
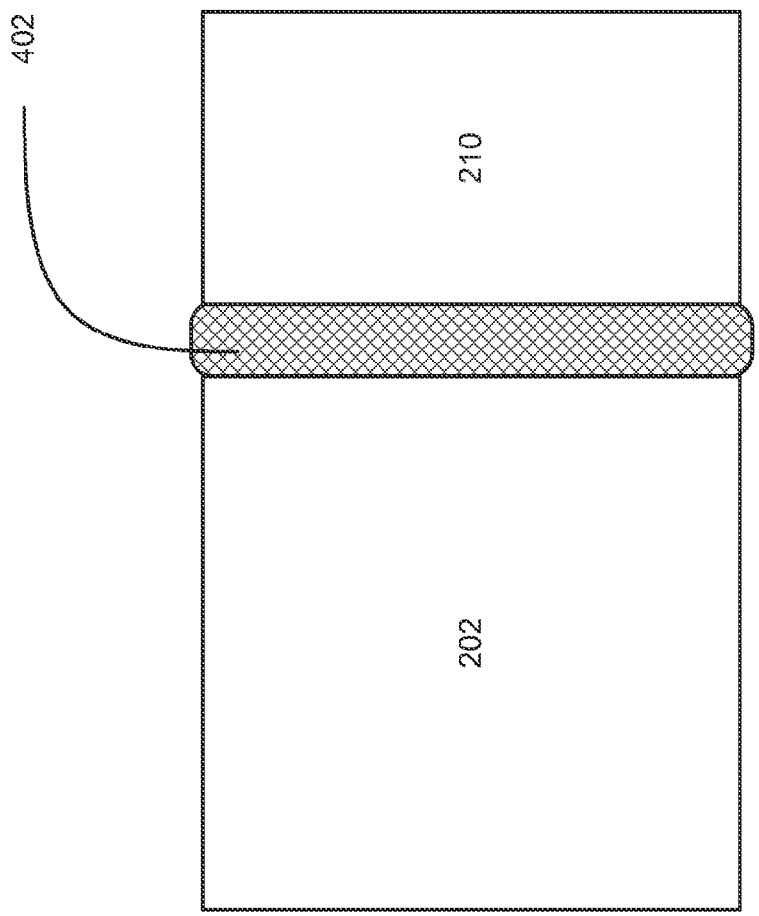
FIG. 4 illustrates a mechanism for joining a body and a side attachment section of a panel, according to embodiments.
Figure 9:
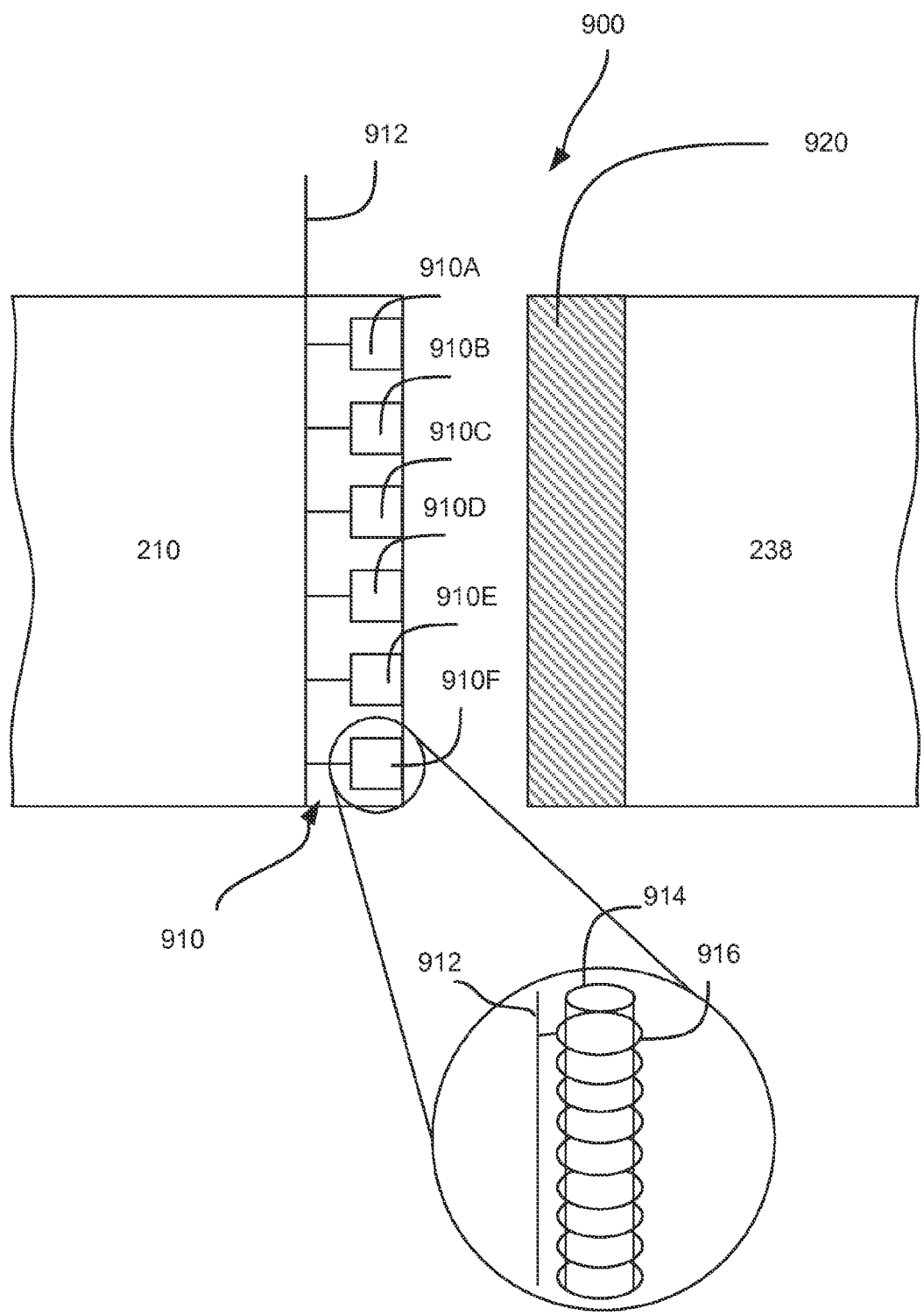
FIG. 9 illustrates an example mechanism, including electromagnets, for joining two panels, according to embodiments.
Figure 10:
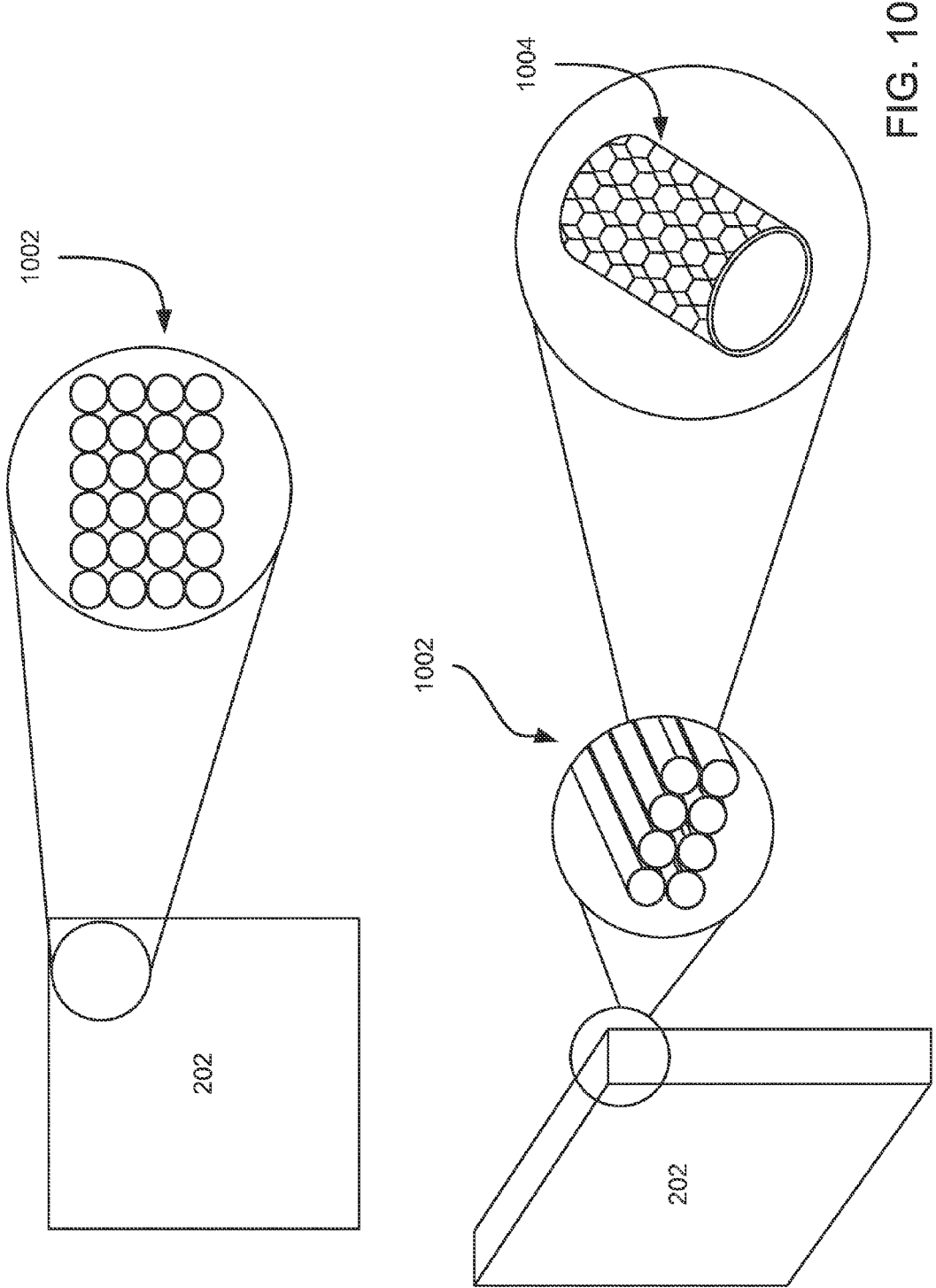
FIG. 10 illustrates an example construct of a body of a panel, according to embodiments.
Figure 11:
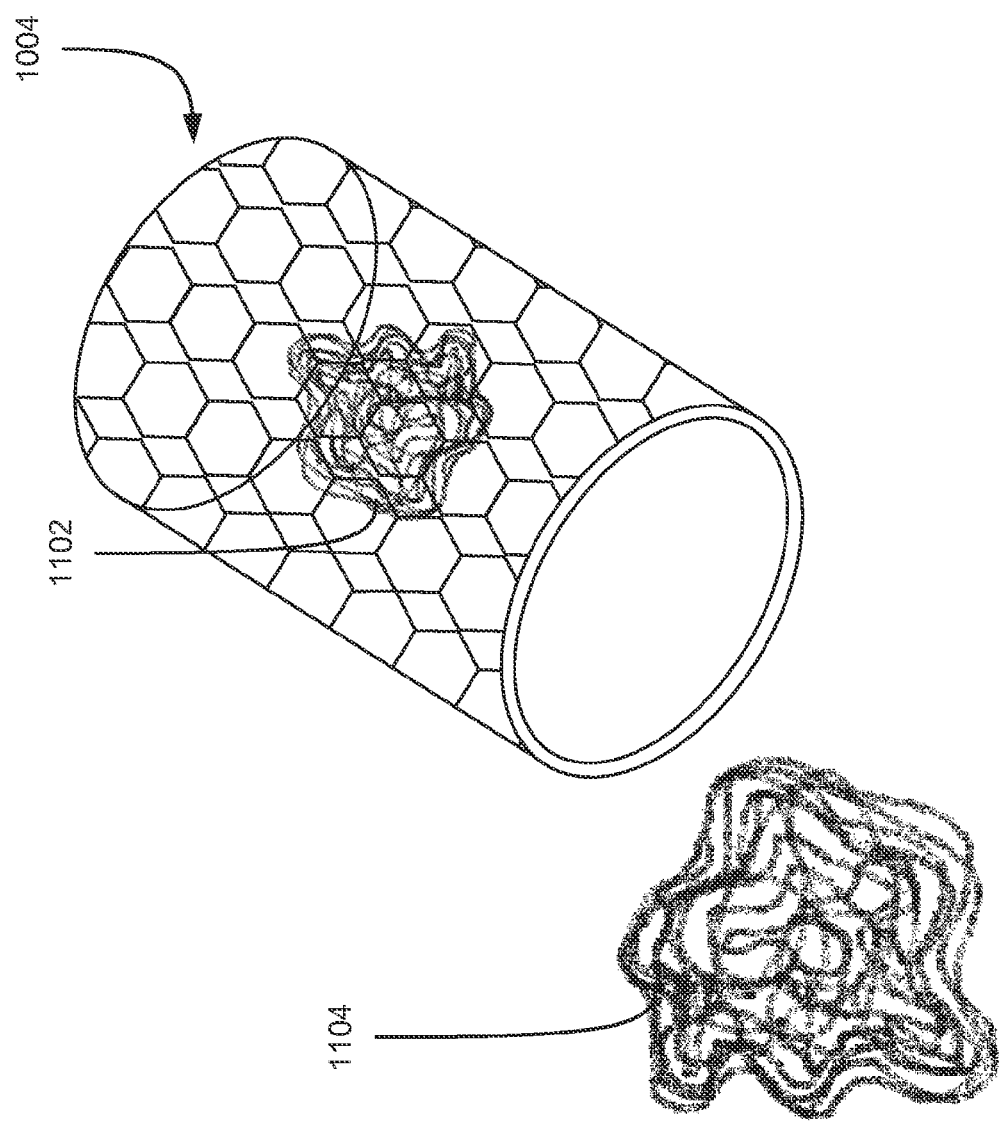
FIG. 11 illustrates an example carbon nanotube configured for filtering oil, according to embodiments.
Figure 12:
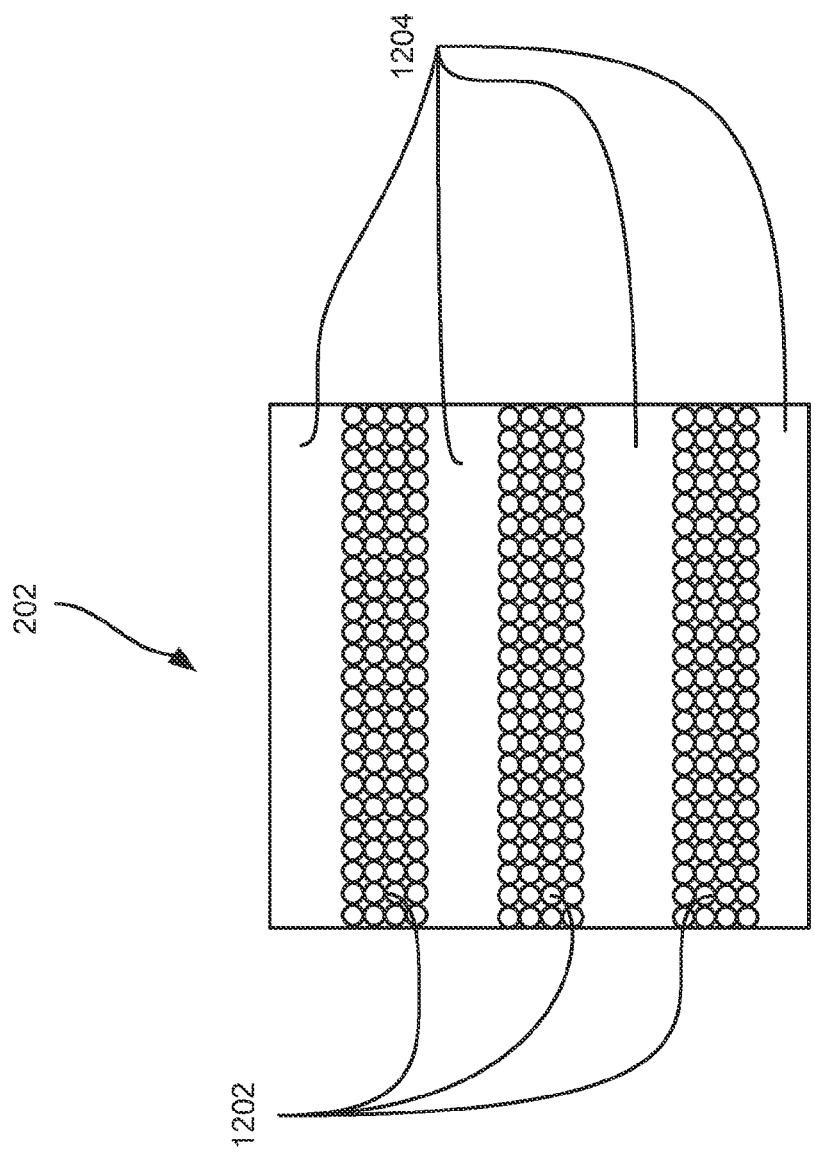
FIG. 12 illustrates another example construct of a body of a panel, according to embodiments.

Additionally, the body 202 has top, bottom, and side edges. The top edge can be connected to a top interface 204 of the filter boom 110. As shown in FIG. 3, the top interface 204 includes attachment points configured to be attached to the deployment mechanism 150. The bottom edge of the body 202 can be connected to a bottom interface 206 of the filter boom 110. As also shown in FIG. 3, the bottom interface 206 can be configured to accept a load such that the body 202 submerges rather than floats in the body of water 130. Each of the side edges of the body 202 can be connected to a side interface, shown as a side interface 208 for a first side edge and a side interface 210 for a second side edge. The side interfaces 208 and 210 can be used to attach the panels as further illustrated in FIGS. 5-9. Example connections between the body 202 and the interfaces are illustrated in FIGS. 3 and 4. Example configurations of the body 202 are illustrated in FIGS. 10-12.

Figure 5:
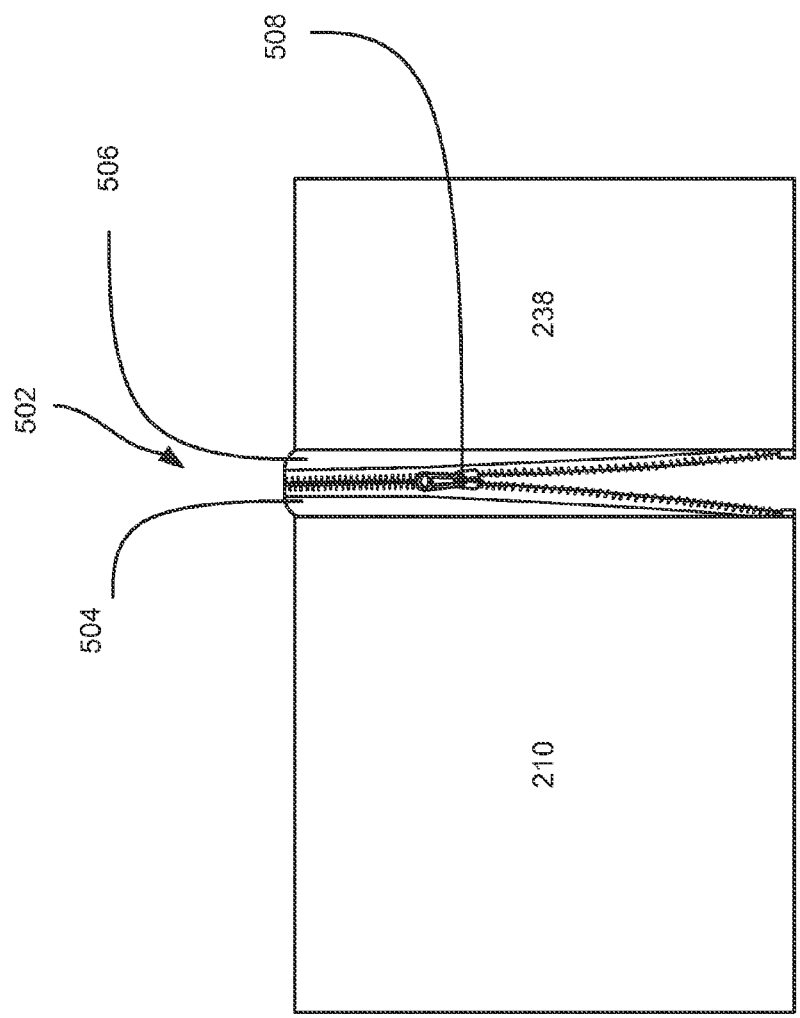
FIG. 5 illustrates an example mechanism, including a waterproof zipper, for joining two panels, according to embodiments.
Figure 6:
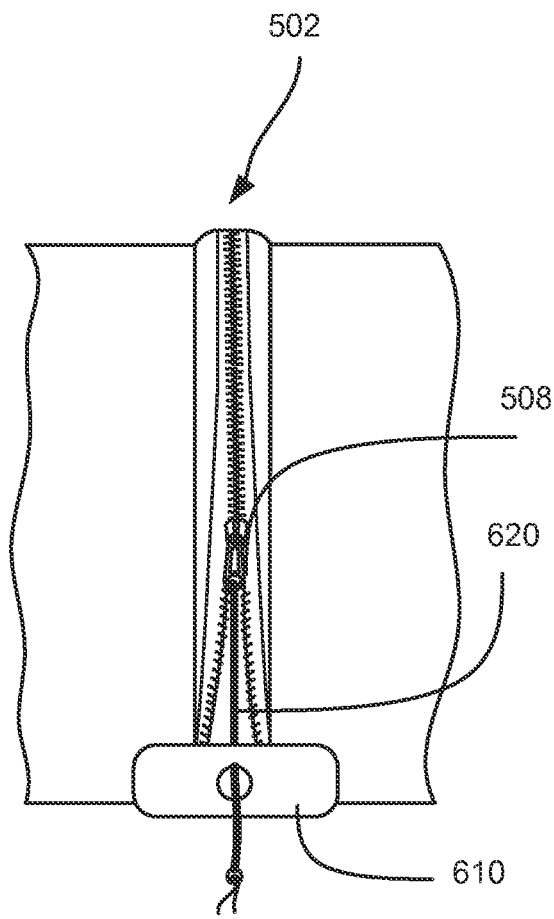
FIG. 6 illustrates a magnified view of an example mechanism, including a weighted waterproof zipper, for joining two panels, according to embodiments.
Figure 7:
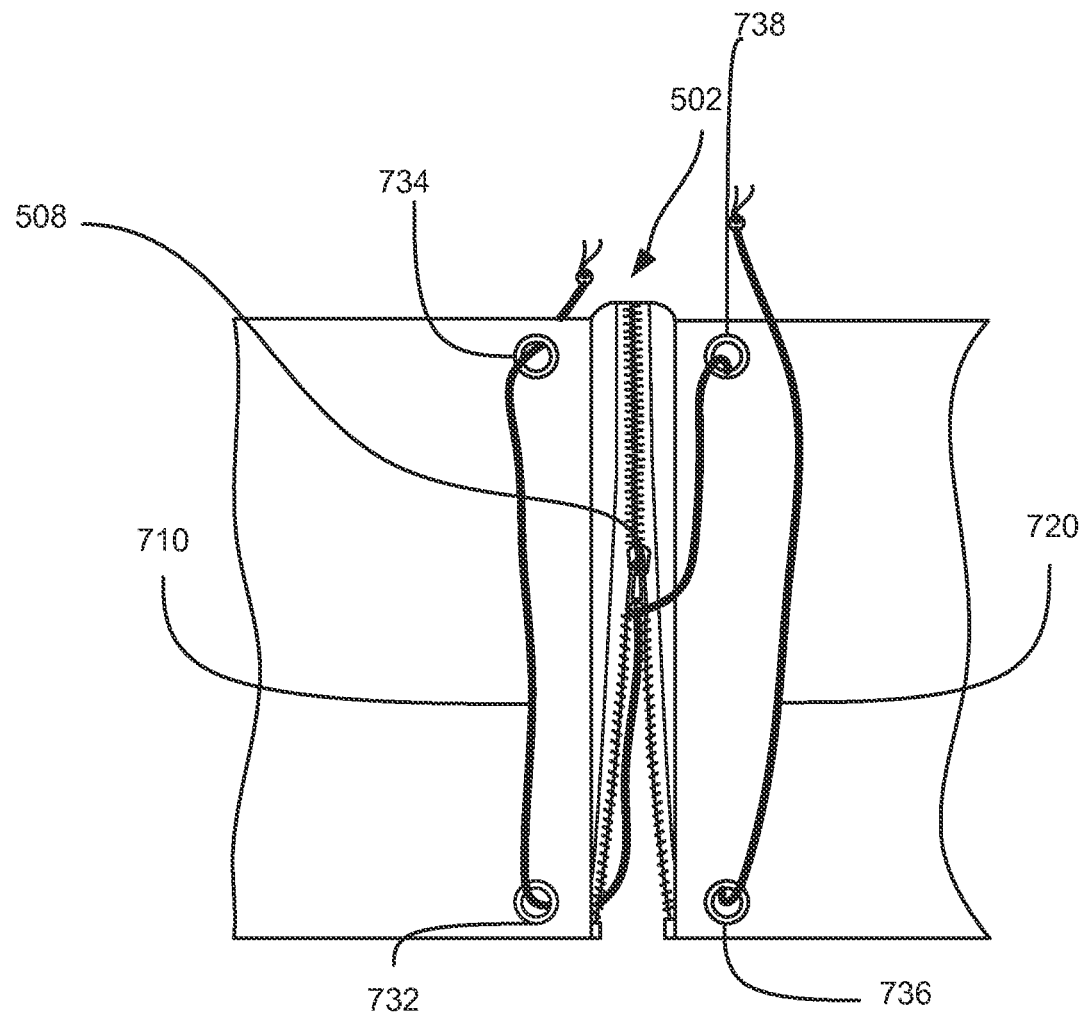
FIG. 7 illustrates a magnified view of another example mechanism, including a weighted waterproof zipper for joining two panels, according to embodiments.
Figure 8:
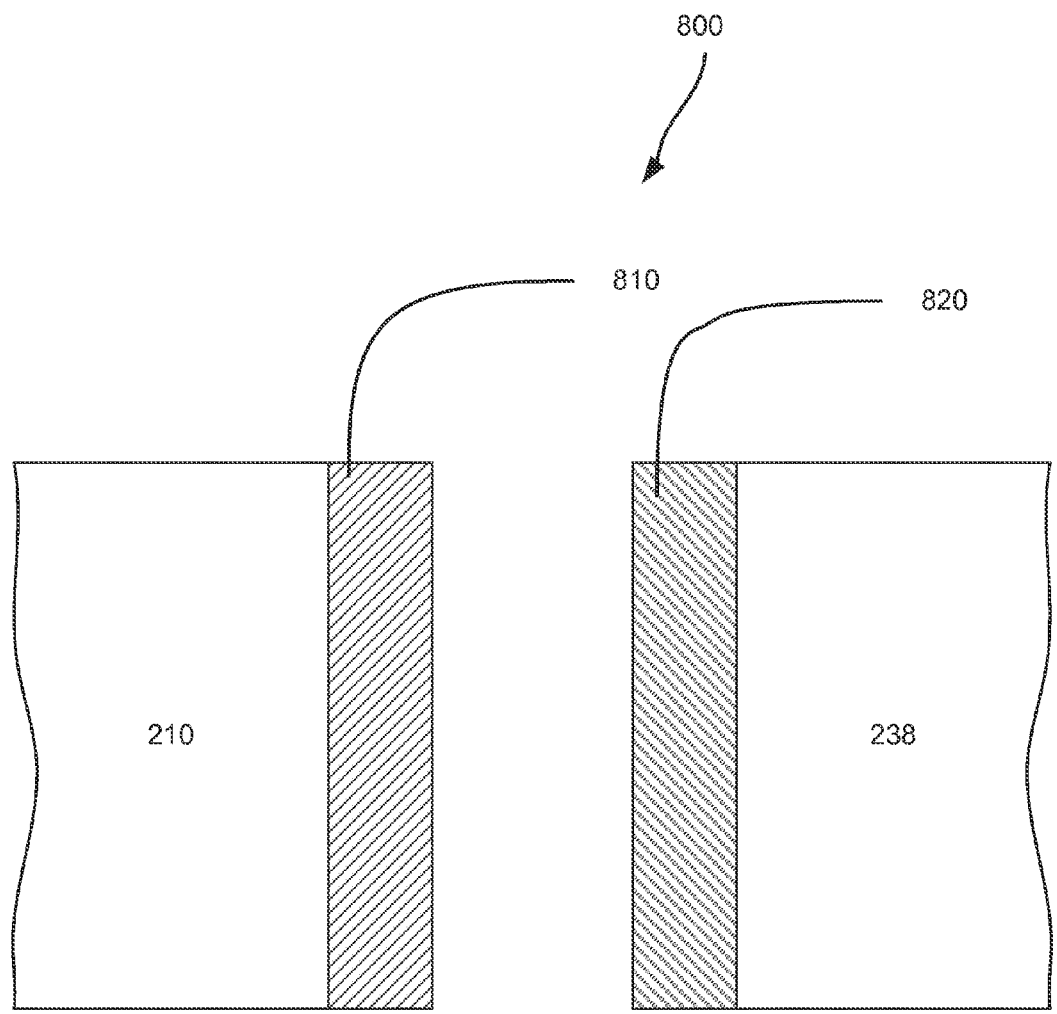
FIG. 8 illustrates an example mechanism, including a magnetized surface, for joining two panels, according to embodiments.

Similarly, the panel 230 also includes a body 232, a top interface 234, a bottom interface 236, and side interfaces 238 and 240. In an example, the side interface 210 and the side interface 238 are used to attach the panels 200 and 230 together. In this example, portions of the side interface 210 may overlap and attach, using various techniques, to portions of the side interface 238, thereby attaching the two panels 200 and 230. These techniques include using zippers as illustrated in FIGS. 5-7, magnets as illustrated in FIG. 8, and electromagnets as illustrated in FIG. 9.

Turning to FIG. 3, that figure illustrates s a cross-section and a side view of the panel 200, omitting the side interfaces 208 and 210 for clarity of illustration. The top interface 204 may be made of a material disposed to create a loop or a hollowed enclosure 302. This material may be the same or may be different than the material that the body 202 is made of. For example, the material includes any or a combination of a fabric made out of a plastic polymer (e.g., polypropylene), a fabric made out of carbon nanotubes, waterproof fabrics, or other types of fabric.

In an embodiment, the enclosure 302 is configured to allow the top panel 204 to float on the surface or at a certain level from the surface of the water. For example, the enclosure 302 can include a number of inflatable cells and a number of valves to seal air in the cells. In another example, the enclosure 302 can accept flotation material such as one made with synthetic fiber material encapsulating a source of buoyancy (e.g., foam). In yet another example, a combination of inflatable cells and floatation material can be used.

In another embodiment, the top interface 204 need not create the enclosure 302. Instead, the top interface 204 can be connected directly to the attachment mechanism 150 by way of the attachment points 310 and the attachment interface 312. This may also be the case even if the enclosure 302 exists. In other words, the enclosure 302 may not be used (e.g., air may not be filled, or flotation material may not be inserted) in this situation.

As further illustrated in FIG. 3, the top interface also includes attachment points 310. These points are configured to attach the panel 200 to the deployment mechanism 150. An example of attachment points 310 includes a series of grommets. Depending on the configuration of the top interface 204 (e.g., whether the enclosure 302 is created or not), the grommets may define holes through the top interface 204 (e.g., from one side to the other of the top interface 204 such that cables can run through the grommets) or through portions of the top interface 204. In the latter case, instead of puncturing the top interface 204, the grommets may secure an attachment interface 312 to the top interface 204. The attachment interface 312 is configured to attach the top interface 204 to the deployment mechanism 150. A hook is one example of the attachment interface 312.

The lower interface 206 may be similarly made of a material disposed to create a loop or a hollowed enclosure 306. However, the enclosure 306 is typically used to accept a load such that the panel 200 submerges in the body of water 130. Typically, the bottom interface 306 should be located deeper than any other portions of the panel 200 when submerged. As such, various loads may be used based on the herein above noted requirements. Generally, the larger the panel 200 and the higher the turbulence are, the heavier the load may become. Examples of loads include chains, weights, pipes, and other loads.

However, in an embodiment, the lower interface 206 need not create the enclosure 306. Instead of inserting a load in the enclosure 306, the load can be attached directly to the lower interface 206. For example, the lower interface may include a number of attachment points (e.g., a series of grommets defining holes in the lower interface 206) that can secure the load.

In an embodiment, the top and lower interfaces 204 and 206 are interchangeable. In other words, the top and lower interfaces 204 and 206 may have similar or identical configurations. For example, the top and lower interfaces 204 and 206 can be made of a same material, have similar sizes, and include similar attachment points. In this case, the panel 200 is non-directional allowing a user to deploy the panel 200 without worrying about the orientation of the panel 200. Instead, to deploy the panel 200, the user at the deployment side can, as convenient, insert or attach a load in one of the interfaces rendering that interface the bottom interface 206 and insert a floatation material or pump air into the other interface or attach the other interface to the deployment mechanism 150.

As further illustrated in FIG. 3, the top interface and the bottom interface are connected to the body 202 by connection structures 304 and 308, respectively. For a non-directional panel 200, the connection structures 304 and 308 may be similar. Otherwise, the connection structures 304 and 308 may be similar or different. Generally, the connection structures 304 and 308 may belong to one of two categories. In a first category, the connection structures permanently connect the corresponding interface to the body 202. Examples of such connection structures include sewing, stitching, and/or gluing the interface to the body 202. In a second category, the connection structures allow the interface to be easily connected to and unconnected from the body 202. Examples of such connection structures include a combination of holes, grommets, cables, hooks, hooks and loops (e.g., ones from Velcro®), and zippers with portions of these connection structures distributed between the interface and the top and/or bottom edge of the body 202. This second category allows the interface to be connected to the body 202 at the deployment site. In this way, the interface can be configured (e.g., whether to serve as a top interface 204 or as a bottom interface 206) separately from the body 202, such that the two can be assembled at the deployment site.

Turning to FIG. 4, that figure illustrates a connection structure 402 for connecting the body 202 to a side interface, such as the side interface 210. The connection structure 402 may be similar to the connection structures 304 or 308. For example, the connection structure 402 may belong to the first category such that the side interface 210 is permanently connected to the body 202. In another example, the connection structure 402 may belong to the second category such that the side interface 210 is connectable to and removable from the body 202.

As previously noted, the side interfaces of the panels are attached to create the structure of the filter boom 110. Generally, an attachment between two panels uses panel-to-panel interfaces distributed between the two panels, which may be referred to herein as a "PtP interface." The PtP interface uses various techniques to effectuate the attachment, including mechanical, magnetic, and electromagnetic techniques. FIGS. 5-7 illustrate examples of mechanical PtP interfaces. In comparison, FIG. 8 illustrates an example of a permanent magnetic PtP interface and FIG. 9 illustrates an example of an electromagnetic PtP interface.

In an embodiment, the PtP interface can be similar to the connection structures 304, 308, and 402 belonging to the second category. In this way, whether connecting a body to a top interface, to a lower interface, or to another body, a user need not worry about the orientation of the panel. In other words, the panel can be truly non-directional.

In another embodiment, the PtP interface may be different from the connection structures 304, 308, and 402. In this embodiment, directionality along one axis (e.g., along the vertical axis, or the side of the panel) may be observed. In other words, this embodiment may avoid a potential misuse or confusion by the user when directionality is important. For example, when different portions of the body have different filtering properties as previously noted, directionality becomes important such that the panel and, thus, the filter boom 110 are properly deployed. In this example, to observe this directionality, the connection structures 304, 308, and 402 may belong to the first category such that the top, the bottom, and the side interfaces are permanently attached to the body of the panel in a predefined orientation. In comparison, the PtP interface allows the panel to be attached to another panel such that the two panels have parallel orientations.

Turning to FIG. 5, that figure illustrates an example of a mechanical PtP interface 502. As shown, the PtP interface 502 includes a waterproof zipper. In an example, the water proof zipper includes zipper sides 504 and 506 (e.g., a zipper tape) and a zipper head 508 (e.g., a zipper pull). The zipper side 504 can be securely attached to the side interface 210 of the panel 200. Similarly, the other zipper side 506 can be securely attached to the side interface 238 of the panel 230. Further, the zipper head 508 is attached to one of the zipper sides (e.g., the zipper side 504) and is moveable along the longitudinal axis of that side. To attach the two panels 200 and 230, an end of the other zipper side (e.g., the zipper side 506) is inserted in the zipper head 508 and the zipper head 508 is moved along the longitudinal axis in one direction. To detach the two panels 200 and 230, the zipper head 508 is moved along the longitudinal axis in the other direction.

The direction to attach and the direction to detach can be defined in various embodiments. In one embodiment, to attach the two panels 200 and 230, the direction may require moving the zipper head 508 away from the top interfaces 204 and 234 towards the bottom interfaces 206 and 236. In another embodiment, this direction is the other way around. Which direction to use may depend on the mechanism used to move the zipper head 508.

For example, as illustrated in FIG. 6, a load 610 is attached to the zipper head 508 by way of a cable 620. The load 610 and the cable 620 are used to improve or ease the attachment of the two panels 200 and 230. To do so, the direction for attaching follows the first embodiment (e.g., from top to bottom). In this way, the two zipper sides 504 and 506 may be inserted in the zipper, the zipper head 508 may be moved in that direction for a sufficient distance to fix the two panels 200 and 230 together, the two panels 200 and 230 may be deployed (e.g., submerged in the body of water 130), and the load 610 may be subsequently deployed. This may allow the load 610 to fall freely in the body of water 130, pulling the two zipper sides 504 and 506 together, thereby further attaching and securing the panels 200 and 230.

To detach the panels 200 and 230, the cable 620 is used to move the zipper head 508 in the other direction. To ease the detachment, the load 610 may be unhooked from the cable 620 before pulling on the cable 620 to cause the movement of the zipper head. The unhooking can be automatic (e.g., the load 610 includes a release mechanism such that after reaching a certain depth, the water pressure at that depth activates the release mechanisms and causes the unhooking). Alternatively, the unhooking can be manual (e.g., a diver unhooks the load 610, or the load 610 includes a release mechanism that can be activated by the cable 620). The load 610 may be subsequently recovered. Alternatively, the load 610 may be abandoned. In this case, the load 610 may made of eco-friendly and biodegradable material such that abandoning the load may not cause an environmental harm.

In another example, the configuration of the PtP interface 502 may render the direction less important. In this case, the direction for attaching can follow the first or second embodiment (e.g., from top to bottom or from bottom to top). An example of such a configuration is illustrated in FIG. 7.

Turning to FIG. 7, that figure illustrates another example of configuring the waterproof zipper to attach the two panels 200 and 230. In particular, a number of cables, such as two cables 710 and 720, may be connected to the zipper head 508, where each cable may be used to move the zipper head 508 in one direction. Therefore, one cable (e.g., the cable 710) can be operated to attach the two panels 200 and 230, while another cable (e.g., the cable 720) can be operated to detach the two panels 200 and 230.

To support this configuration, the side interfaces 210 and 238 of the panels 200 and 230 may include a number of grommets, where the grommets may define holes. As shown in FIG. 7, the side interface 210 of the panel 200 includes grommets 732 and 734. An end of the cable 710 may be securely connected to the zipper head 508, while the other end of the cable 710 may be looped around the side interface 210 through the holes of the grommets 734 and 732. Similarly, the side interface 238 of the panel 230 includes grommets 736 and 738. An end of the cable 720 may be securely connected to the zipper head 508, while the other end of the cable 720 may be looped around the side interface 238 through the holes of the grommets 736 and 738 but in an opposite direction as the direction used to loop the cable 710. In this way, pulling the cable 710 causes the two sides of the zipper to be pulled together and thereby attaching the two panels 200 and 230. In comparison, pulling the cable 720 causes the two sides of the zipper to be pulled away from each other and thereby detaching the two panels 200 and 230. The pulling may be automatic (e.g., the cables 710 and 720 may be connected to a pulling mechanism of the deployment mechanism 150) or manual (e.g., a user may pull on the cables 710 and 720).

Although FIGS. 5-7 illustrate a waterproof zipper as an example of a mechanical PtP interface 502, other types of mechanical PtP interfaces may be also used. For example, hooks and loops (e.g., ones from Velcro®) may be used in a similar way as the waterproof zipper. Additionally, series of grommets, hooks, cable, and other mechanical interfaces can be used.

Turning to FIG. 8, that figure illustrates an example of a magnetic PtP interface 800. The PtP interface 800 includes a number of magnetic portions, including a magnetic portion 810 and a magnetic portion 820. The portions can be made of a magnetic material to effectuate magnets. Further, the magnetic material may be flexible to allow the PtP interface 800 to be folded (e.g., rolled) and stored along with the panel.

Each of the magnetic portions can be connected to a panel. The connection can occur at a side interface. For example, the magnetic portion 810 can be secured to the side interface 210 and the magnetic portion 820 can be secured to the side interface 238. Various means are available to effectuate the connection including, for example, gluing, stitching, weaving, or other means for securing the magnetic portion to the corresponding panel interface. Alternatively, each magnetic portion can be connected directly to a body or to some other section of a panel.

The length of each magnetic portion (e.g., the magnetic portion 810) may be substantially similar to the length of the corresponding side interface (e.g., the side interface 210). Alternatively, the side interface may incorporate a number of magnetic portions (e.g., the magnetic portion 810 is made up of a series of magnetic sub-portions attached to the side interface 210). In this embodiment, a magnetic sub-portion may be separated from a next magnetic sub-portion by a certain distance. The distance may be function of the length of the sub-portion. In an example, the distance may be equal to the length or to some fraction (e.g., half) of the length of the sub-portion. In another example, the distance may be a function of the depth at which the sub-portion may be located. In other words, the deeper the sub-portions may be deployed in, the smaller the distance between the sub-portions may be. In this way, because of higher pressure at deeper water levels, larger magnetic forces may be needed to maintain a connection between the two panels. The larger magnetic forces may be achieved by reducing the distance between the sub-portions.

The width of a magnetic portion may be also a function of the width of the corresponding side interface. In an embodiment, the width may be equal or a fraction (e.g., half) of the width of the side interface. This width may be also a function of the length of the side interface. Said differently, the deeper the magnetic portion (or sub-portion) may be deployed, the wider the width may be. Again, in this way, larger magnetic forces may be achieved to maintain a connection between two panels. As such, the width of the magnetic portion (or sub-portion) may not be uniform across the side interface.

Typically, the magnetic portions are configured to allow connecting two panels by way of magnetic forces. That includes, for example, using magnets of opposite polarities. In other words, for a same panel, a panel interface may include a magnetic portion of a certain polarity and an opposite panel interface may include a magnetic portion of an opposite polarity. This pattern can be repeated across the different panels such that when two panels are to be connected, side interfaces having magnetic portions of opposite polarities may be brought together. As illustrated in FIG. 8, the magnetic portions 810 and 820 may be of opposite polarities. When in proximity of each other or in contact, the magnetic portions 810 and 820 connect the side interfaces 210 and 238, and accordingly the panels 200 and 230, by way of magnetic forces.

In an alternative embodiment, only one magnetic portion may be used while the other portion of the magnetic PtP interface 800 may be made of a metallic material. This embodiment may also allow panels to be connected by smaller but yet large enough magnetic forces. To illustrate the magnetic portion 810 may be made of a magnetic material while the portion 820 may be made out of a metallic material.

To protect against potential corrosion from salt water, protective layer may be added to the portions 810 and 8120 (magnetic or metallic). The protective layer may reduce but should not inhibit the application of magnetic forces. In an example, the protective layer includes a thin plastic film, a thin conductive film, or other protective layers.

Turning to FIG. 9, that figure illustrates an electromagnetic PtP interface 900. The electromagnetic PtP interface 900 can be similar (e.g., materials, securing means, length, size, protective layer, and other aspects) to the magnetic PtP interface 800 except that the electromagnetic PtP interface 900 may use electromagnets. In the interest of clarity of explanation, FIG. 9 illustrates only one portion (shown as an electromagnetic portion 910) that may use electromagnets while the other portion (shown as an electromagnetic portion 920) may be a magnetic portion (e.g., similar to the magnetic portion 820) or a metallic portion. However, both portions may use electromagnets.

As illustrated in FIG. 9, the electromagnetic portion 910 may include a series of electromagnets 910A-F interconnected by a conductive wire 912. Each of the electromagnets may include a core 914 and a coil 916. The core 914 may be made of a ferromagnetic material, such as soft iron. The coil 916 may be a conductive wire that is coupled (e.g., conductively connected) to the wire 912. The conductive wire 912 may be connected to an electric current source at, for example, the corresponding deployment site. By applying a current to the electromagnets 910A-F, magnetic fields may be created around the electromagnets 910A-F allowing the use of magnetic forces to connect the side interface and, thus, the panel, to another side interface similarly to what is illustrated in FIG. 8.

Although FIG. 9 illustrates a single wire 912 connected to the various electromagnets, another number of wires or configuration of electromagnets may be used. In an embodiment, there may be sets of electromagnets, where each set or a number of the sets may be connected to a wire. This embodiment may allow the application of different currents to the different sets, thereby creating different magnetic forces. In other words, a user may control the magnetic forces across the side interface so that if a larger or a smaller magnetic force needs to be created in one portion of the side interface, the user may do so by applying the proper current to the corresponding set of electromagnets through the corresponding connecting wire. As such, if larger magnetic forces are required at deeper levels and smaller magnetic forces are required at shallower levels, a larger current can be applied to the set of electromagnets located at the deeper levels and a smaller current can be applied to the set of electromagnets located at the shallower levels. Similarly, to connect or disconnect two side interfaces (e.g., the side interface 210 and 238), the user may apply the current in a sequential manner. For example, the user may deploy the two panels and may start applying the current in a top-down approach (e.g., the first set of electromagnets located at the surface may be energized first, then the next set and so on until the last set located at the deepest level). In this way, the side interfaces may sequentially be connected from the top to the bottom.

Turning to FIGS. 10-12, an example of a body of a panel is illustrated. More particularly, FIG. 10 illustrates the use of carbon nanotubes (CNTs) in the body 202 shown in FIG. 2. In comparison, FIG. 11 illustrates an example of a carbon nanotube and the associated water filtering properties. FIG. 12 illustrates an example of also using other filtering and non-filtering materials in the body 202.

As illustrated in FIG. 10, the body 202 can include portions or can be made entirely of CNTs 1002. To allow water filtering, the CNTs should be properly aligned. In a configuration, the CNTs can be configured to be parallel to the surface of the body of water so that water can flow out of the contaminated area. A CNT 1004 includes a front face (or first opening), a back face (or second opening), and a body that connects the two faces. A parallel configuration of the CTNs includes aligning front faces (or first openings) in a parallel structure (e.g., the front faces ma belong to a same vertical plan). Similarly, the back faces (or second openings) of the CNTs can be aligned. Further, the parallel configuration need not but can include aligning the bodies of the CNTs in parallel. The more parallel the bodies are, the faster the filtering may be.

Orienting the CNTs (e.g., horizontally, at an angle, or some other orientation through the body 202) may be a function of the filtering requirements. In other words, if all CNTs were substantially horizontally aligned, the water flow may be the highest in volume. However, if a lower flow is required or some other requirement exists, other sets of alignments may be used. For example, the CNTs may be configured in groups, where one group may have bodies horizontally aligned, a group may have bodies aligned at a particular angle (e.g., 30 degrees oriented downward), and another group may have bodies aligned at an opposite angle (e.g., 30 degrees oriented upward). In this example, the oppositely aligned groups may act to stabilize the body 202 (e.g., in high turbulence area) while also filtering water.

Various techniques may be used to produce the body 202 with flexible CNTs 1002. Generally, a chemical vapor deposition (CVD) process coupled with a mechanical process and other processes (e.g., etching) can be used to produce parallel aligned CNTs. In an example, the CVD process includes thermal chemical vapor deposition on a substrate, such as silicon (Si) or a metallic substrate (e.g., using titanium (Ti)), to produce, for example, single-walled nanotubes (SWNTs). The mechanical process includes continuously rolling, pulling, and other processes applied to the substrate and the CNTs. For example, when using a pulling process, a thin ribbon of aerogel can be deposited on top of the CNTs. Where the aerogel and the CNTs meet, the corresponding CNTs typically catch on the aerogel and can be pulled away from the substrate. Because of the close packing of the CNTs and because of molecular-level forces, a CNT breaking away can also pull away other CNTs, resulting in a parallel alignment of the CNTs at the surface of the ribbon. Multiple ribbons of aerogel and CNTs can be layered on top of each other. The aerogel can then be dissolved, leaving a flexible membrane of CNTs held together by atomic forces. Multiple membranes of CNTs can be assembled to produce portions or all of the body 202. Other techniques may also involve creating threads of CNTs. These threads can be inter-weaved or weaved with other fabric material (e.g., a lightweight polymer thread) to form the body 202. The applied processes generally allow the control of the alignment (e.g., parallel alignment) and sizes of the CNTs.

The size of a CNT 1004 can be expressed in length and diameter. The length can be set to be the same as the width (or thickness) of the body 202. For example, the length can be up to seven inches. However, the lengths of the various CNTs in the body 202 can but need not be uniform. More particularly, the lengths can depend on flow requirements. For example, the deeper the distance that the CNTs may be deployed at, the longer (or shorter depending on the requirement) the corresponding lengths may be. In other words, the thickness of the body 202 may vary depending on the length of the body 202, such that on one end of the body 202 (e.g., the end connecting to the top interface 204) the thickness may be the smallest, and on the opposite end of the body 202 (e.g., the end connecting to the bottom interface 206) the thickness may be the largest. In this example, the lengths of the CNTs may vary, for instance, from one eighth of an inch (on the one end) to seven inches (on the opposite end).

In comparison, the internal diameter of a CNT 1004 may vary between 0.8 nanometer (nm) and 1.2 nm ($3.14 \times 10^{-8}$ inches to $4.73 \times 10^{-8}$ inches). As further illustrated in FIG. 11, this internal diameter range may allow filtering of the water and retention of oil particles and oil-borne contaminants. Experimentation has shown that an internal diameter between 1.1 nm and 1.2 nm ($4.33 \times 10^{-8}$ inches to $4.73 \times 10^{-8}$ inches) may allow a larger flow of water than an internal diameter of a smaller size. Thus, similarly to varying the lengths of the CNTs to meet certain flow and other requirements, the internal diameters of the CNTs may likewise be varied. In other words, the internal diameters of the CNTs can but need not be uniform across the body 202. To illustrate and continuing with the previous example, longer CNTs in the body 202 may be configured to have larger internal diameters in the range of 1.1 nm and 1.2 nm ($4.33 \times 10^{-8}$ inches to $4.73 \times 10^{-8}$ inches) while shorter CNTs in the body 202 may be configured to have smaller internal diameters in the range of 0.8 nm to 1.1 nm ($3.14 \times 10^{-8}$ inches to $4.33 \times 10^{-8}$ inches).

Turning to FIG. 11, that figure illustrates an example CNT 1004. Generally, the CNT 1004 is an allotrope of carbon with a cylindrical structure. As noted herein above, this structure can be described using length and diameter, and other properties. Experimentation by Goddard and Pascal published in the Proceedings of the National Academy of Sciences (PNAS), volume 108, number 29, published on May 25, 2011, has shown that, by varying the internal diameter of the structure, the flow of the water through the CNT 1004 may be affected. In particular, when water flows through a CNT 1004 with an internal diameter between 0.8 nm and 1.0 nm ($3.14 \times 10^{-8}$ inches to $3.93 \times 10^{-8}$ inches), the water molecules line up in a nearly single file and take on a gas-like state. That means the normal bonded structure of liquid water breaks down, giving the molecules greater freedom of motion. This increase in entropy draws water into the CNT 1004. In comparison, if a CNT 1004 of an internal diameter between 1.1 nm and 1.2 nm ($4.33 \times 10^{-8}$ inches to $4.73 \times 10^{-8}$ inches) is used instead, confined water molecules arrange themselves in stacked, ice-like crystals. These crystal-bonding interactions, not entropy, make it favorable for water to flow into the CNT 1004.

Furthermore, oil particles and oil-borne contaminants typically have diameters that are greater than 1.2 nm ($4.73 \times 10^{-8}$ inches). Thus, by limiting the size of the CNTs to 1.2 nm ($4.73 \times 10^{-8}$ inches) or less, the CNTs may allow water molecules to flow while blocking the oil particles and oil-borne contaminants, resulting in filtering the water. FIG. 11 illustrates this scenario where a water molecule 1102 can pass through the CNT 1004 while an oil particle 1104 may not.

Turning to FIG. 12, that figure illustrates an example of a body of a panel (e.g., the body 202) that may be made using a combination of materials, including CNT and non-CNT materials. In particular, although lightweight, strong, and flexible, CNTs may be, for example, more expensive to produce than other materials. Thus, to balance between benefits and cost of using CNTs, the body 202 may use a combination of CNT portions 1202 and non-CNT portions 1204. The CNT portions 1202 may include CNTs similarly to what is illustrated in FIGS. 10 and 11. The non-CNT portions 1204 may include materials that do not necessarily use CNTs. In particular, these materials may include non-filtering materials (e.g., a lightweight polymer such as nylon) and/or may include filtering materials (e.g., a standard polypropylene filtering material, a synthetic filtering fiber, or other materials).

Using various means, a CNT portion 1202 and a non-CNT portion 1204 may be attached together to form portions of the body 202. For example, stitching, gluing, weaving, hooking, using Velcro, using magnets, using electromagnets, or other means can be implemented for attaching edges of the two portions 1202 and 1204 together.

Furthermore, the spacing, sizing, and/or patterning of the portions may be based on flow requirements. For example, CNT portions 1202 and non-CNT filtering portions 1204 can be interleaved. The heights of the different portions can but need not be the same. For example, the height of the CNT portions 1202 may be same, the height of the non-CNT filtering portions 1204, but the two heights may be different. In this example, the height of the CNT portion 1202 may be double or some other function of the other height. Similarly, the heights of the different portions can but need not be uniform. For example, the heights may vary depending on the associated deployable depth. To illustrate, a CNT portion deployable at a certain depth level may have a greater height than another CNT portion deployable at a shallower level, while the corresponding non-CNT portions 1204 adjacent to these two CNT portions may have the same height. In another example, because potential high turbulence at deeper level may require a stronger material, the patterning of the body 202 may include using a larger number of CNT portions 1202 for the section of the body 202 that may be deployed at the deeper level and a larger number of non-CNT portions of the parts of the section of the body 202 that may be deployed at the shallower level. In on example, the bottom part of the body 202 may be made with CNTs of internal diameters between 1.1 nm and 1.2 nm ($4.33 \times 10^{-8}$ inches to $4.73 \times 10^{-8}$ inches) while the top part of the body 202 may be made of a non-CNT filtering portion 1204. This may ensure that heavier oil particles and oil-borne contaminants (e.g., molecules with internal diameters much larger than 1.2 nm ($4.73 \times 10^{-8}$ inches)) located at deeper levels can be efficiently filtered.

Although FIGS. 10-12 describe CNTS used in a body of a panel, CNTs may likewise be used in other portions of the panel. For example, a side interface, a top interface, or a bottom interface of the panel or portions thereof may similarly use CNTs.

It is understood that the examples and embodiments described herein are for illustrative purposes only and that various modifications or changes in light thereof may be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein. The use of different terms or reference numerals for similar features in different embodiments does not necessarily imply differences other than those which may be expressly set forth. Accordingly, the present disclosure is intended to be described solely by reference to the appended claims, and not limited to the preferred embodiments disclosed herein.

What is claimed is:

1. A filter boom for surface and subsurface filtering of water contained in a fluid volume contaminated with oil, the filter boom comprising:
   a first fabric having a top edge, a first side edge, a bottom edge, and a body, wherein:
   the body has a first face and a second face and comprises a plurality of carbon nanotubes, and
   the plurality of carbon nanotubes are disposed between the first face and the second face and are oriented such that, when the body is submerged in a fluid volume and when water and oil of the fluid volume contact the first face, the water in contact with the first face filters though the nanotubes from the first face towards the second face while the oil in contact with the first face is retained; and a second fabric having a second side edge, wherein the second side edge of the second fabric is configured to attach to the first side edge of the first fabric.

2. The filter boom of claim 1, wherein a carbon nanotube of the plurality of carbon nanotubes has an internal diameter that ranges between 0.8 nanometers and 1.2 nanometers.

3. The filter boom of claim 1, wherein a carbon nanotube of the plurality of carbon nanotubes has a length that ranges between ⅛" and 7".

4. The filter boom of claim 1, wherein the plurality of carbon nanotubes are oriented in an orientation determined based on a water flow requirement of the filter boom.

5. The filter boom of claim 4, wherein the orientation comprises two or more carbon nanotubes of the plurality of carbon nanotubes with corresponding longitudinal axes aligned in parallel.

6. The filter boom of claim 1, wherein the first fabric and the second fabric have same dimensions and comprise materials of a same type.

7. The filter boom of claim 1, wherein the top edge comprises a pocket configured to fit a flotation device and comprises attachment points configured to attach to a deployment system.

8. The filter boom of claim 1, wherein the bottom edge comprises a pocket configured to fit a load.

9. The filter boom of claim 1, wherein the bottom edge comprises a pocket configured to fit a load.

10. The filter boom of claim 1, wherein the first side edge comprises a first component of an attachment mechanism, wherein the second side edge comprises a second component of an attachment mechanism, and wherein the attachment mechanism comprises a waterproof zipper.

11. The filter boom of claim 10, wherein the attachment mechanism comprises a load, a pulley, and a cable.

12. The filter boom of claim 1, wherein the first side edge comprises a flexible magnet, wherein the second side edge comprises a surface of carbon nanotubes, and wherein the flexible magnet is configured to magnetically couple with the surface of carbon nanotubes such that the first fabric and the second fabric are attached.

13. The filter boom of claim 1, wherein the first side edge comprises a series of electromagnets electrically connected to an electrical source, wherein the second side edge comprises a series of carbon nanotubes, and wherein when the electrical source is energized, the series of electromagnets magnetically couple the series of carbon nanotubes such that the first fabric and the second fabric are attached.

14. The filter boom of claim 13, wherein an electromagnet of a series of electromagnets comprises an insulated wire coiled around a core of carbon nanotubes.

15. The filter boom of claim 14, wherein the plurality of carbon nanotubes in the first body comprises semi-conductive nanotubes, and wherein nanotubes in the core of carbon nanotubes comprise conductive nanotubes.

16. The filter boom of claim 1, wherein the first body comprises a first section and a second section, wherein the first section comprises the plurality of carbon nanotubes, and wherein the second section comprises a second filtering material.

17. The filter boom of claim 16, wherein dimensions of the first section and the second sections are determined based on a water flow requirement of the filter boom.

18. A filter boom for surface and subsurface filtering of water in a fluid volume contaminated with oil, the filter boom comprising:
 a fabric having a top edge, a bottom edge, and a body, wherein:
 the top edge is configured to float on a surface of a fluid volume;
 the bottom edge is configured to sink below the surface, wherein the sinking submerges the body below the surface,
 the body has a first face and a second face and comprises a plurality of carbon nanotubes, and
 the plurality of carbon nanotubes are disposed between the first face and the second face and are oriented such that, when the body is submerged in the fluid volume and when water and oil from the fluid volume contact the first face, the water in contact with the first face filters though the nanotubes from the first face towards the second face while the oil in contact with the first face is retained.

19. The filter boom of claim 1, wherein a carbon nanotube of the plurality of carbon nanotubes has an internal diameter that ranges between 0.8 nanometers and 1.2 nanometers.

20. The filter boom of claim 1, wherein a carbon nanotube of the plurality of carbon nanotubes has a length that ranges between ⅛" and 7".

* * * * *